United States Patent
Hammoud et al.

(10) Patent No.: US 6,405,706 B1
(45) Date of Patent: Jun. 18, 2002

(54) SYSTEM AND METHOD FOR MIXTURE PREPARATION CONTROL OF AN INTERNAL COMBUSTION ENGINE

(75) Inventors: Mazen Hammoud, Dearborn; Mohammad Haghgooie, Ann Arbor, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/631,363

(22) Filed: Aug. 2, 2000

(51) Int. Cl.[7] .................. F01L 1/34; F02B 47/08; F02M 25/07
(52) U.S. Cl. ............... 123/316; 123/90.11; 123/90.15; 123/568.14
(58) Field of Search ............... 123/568.14, 90.15, 123/90.11, 316

(56) References Cited

U.S. PATENT DOCUMENTS

| | | | |
|---|---|---|---|
| 4,104,991 A | | 8/1978 | Abdoo |
| 4,538,569 A | * | 9/1985 | Sugino et al. ............... 123/316 |
| 4,700,684 A | * | 10/1987 | Pischinger et al. .... 123/568.14 |
| 4,722,315 A | * | 2/1988 | Pickel ........................ 123/568 |
| 4,995,351 A | * | 2/1991 | Ohkubo et al. .......... 123/90.11 |
| 5,009,203 A | | 4/1991 | Seld |
| 5,022,357 A | | 6/1991 | Kawamura |
| 5,024,191 A | * | 6/1991 | Nagahiro et al. ....... 123/198 D |
| 5,072,700 A | | 12/1991 | Kawamura |
| 5,117,790 A | | 6/1992 | Clarke et al. |
| 5,161,497 A | | 11/1992 | Simko et al. |
| 5,255,637 A | | 10/1993 | Schechter |
| 5,271,229 A | | 12/1993 | Clarke et al. |
| 5,398,502 A | * | 3/1995 | Watanabe ..................... 60/284 |
| 5,450,824 A | | 9/1995 | Yamane et al. |
| 5,469,818 A | | 11/1995 | Yoshioka et al. |
| 5,496,229 A | | 3/1996 | Miyamoto |
| 5,626,109 A | | 5/1997 | Yasumura |
| 5,679,094 A | | 10/1997 | Nakamura |
| 5,845,613 A | | 12/1998 | Yoshikawa |
| 5,930,992 A | * | 8/1999 | Esch et al. ..................... 60/274 |
| 5,957,095 A | * | 9/1999 | Kano ....................... 123/90.15 |
| 5,967,114 A | * | 10/1999 | Yasuoka ..................... 123/295 |
| 6,055,948 A | * | 5/2000 | Shiraishi et al. ......... 123/90.15 |
| 6,073,596 A | * | 6/2000 | Kemper .................... 123/90.11 |
| 6,148,791 A | * | 11/2000 | Fujieda et al. ............... 123/295 |
| 6,178,934 B1 | * | 1/2001 | Hirasawa et al. ........ 123/90.11 |
| 6,213,068 B1 | * | 4/2001 | Hassdenteufel .......... 123/90.15 |
| 6,276,316 B1 | * | 8/2001 | Arai et al. ................ 123/90.11 |

FOREIGN PATENT DOCUMENTS

JP 252575 * 9/1998 .......... F02M/25/07

* cited by examiner

Primary Examiner—Tony M. Argenbright
Assistant Examiner—Hai Huynh
(74) Attorney, Agent, or Firm—Ford Global Tech., Inc.

(57) ABSTRACT

A system and method for the control and preparation of the combined fuel and air mixture in a camless internal combustion engine. The system and method provide increased engine operating efficiency and lower exhaust emissions during low speed and cold engine conditions.

13 Claims, 3 Drawing Sheets

SYSTEM AND METHOD FOR MIXTURE PREPARATION CONTROL OF AN INTERNAL COMBUSTION ENGINE

FIELD OF THE INVENTION

This invention relates to a system and method for mixture preparation control in an internal combustion engine and more particularly, to a system and method which controls the preheating of the fuel and air mixture within an internal combustion engine prior to entry into the engine's combustion chamber by the use of electromechanical or electrohydraulic valve actuators for enhanced efficiency and lower exhaust emissions.

BACKGROUND OF THE INVENTION

Valve timing systems, arrangements and assemblies are used in internal combustion engines in order to alter the timing of the opening and closing of the engine's intake and/or exhaust valves. Prior valve timing systems typically include one or more camshafts and cam timing assemblies which selectively advance and/or delay the rotation of one or more camshafts relative to the crankshaft, thereby controlling the actuation of the intake and exhaust valves.

These prior systems and valve timing profiles used by these systems suffer from several drawbacks.

Particularly, these prior cam-driven systems are ineffective to dynamically adjust or control valve overlap (i.e., situations in which both the intake and exhaust valves are open), due to their inherent physical limitations. In order to generate maximum power at high speeds, a relatively high degree of valve overlap is required. However, at low speeds (e.g., at idling conditions), a high degree of valve overlap undesirably causes high emissions and poor fuel efficiency. Additionally, low fuel/air mixture velocities in the intake ports at low engine speeds compound the problems. During cold starts and idling prior to engine "warm up", liquid fuel usually forms a pool in the intake port and possibly enters the combustion chamber as a stream during intake valve opening. This results in undesirable oil degradation, fuel waste, and higher hydrocarbon emissions.

Due to the inability of these prior systems to efficiently and dynamically adjust the timing of the valves during different vehicle operating modes, the valve timing profiles used within these prior systems are typically a compromise between power output at high engine speeds and proper idling at low engine speeds. The compromise is generally designed to favor the production of output power, good efficiency, and lower exhaust emissions at higher engine speeds. However, relatively high exhaust emssions, low fuel economy and poor efficiency of the engine at idle speeds remain as undesirable drawbacks.

Efforts have been made to increase the efficiency of vehicle engines and reduce emissions by eliminating the camshafts and operating the intake and exhaust valves through the use of selectively controllable electromechanical or electrohydraulic actuators. These types of systems eliminate many problems related to the physical characteristics of cam-driven systems and offer additional flexibility in valve timing. However, these prior camless systems are typically implemented using conventional cam-driven valve timing, and thus, suffer from many of the same previously delineated drawbacks. For example and without limitation, the valve timing used within these systems is typically calibrated or programmed during the manufacturing process and is not dynamically controllable during the operation of the vehicle. As a result, the valve's timing again typically compromises between power output at high engine speeds and proper idling at low engine speeds in a manner similar to the prior cam-driven systems. Hence, these systems still fail to provide fuel efficiency and low exhaust emissions at idle speeds. Additionally, because these timings are typically "set" or "fixed" during manufacture, they are unable to be selectively and dynamically altered to control the engine to achieve maximum efficiency during both high engine speeds and idle operation of the vehicle. In addition, the fuel/air mixture is still susceptible to fuel condensation, liquid streaming into the combustion chamber, and low charge flow velocities at idle.

There is therefore a need for a new and improved valve actuation system for use with a camless engine which overcomes the drawbacks associated with low speed operation of an internal combustion engine. The Applicants' invention addresses these drawbacks and provides a system and a method for dynamically controlling the valve timing events of the camless engine and which compensates for the effects of low speed idle on engine efficiency, fuel economy and exhaust emissions.

SUMMARY OF THE INVENTION

It is a first object of the invention to provide a system and method for the control and preparation of the combined fuel and air mixture in an internal combustion engine, which overcomes at least some of the previously delineated drawbacks of the prior systems, devices, and/or methods.

It is a second object of the invention to provide a method strategy, or methodology, for controlling valve actuators to preheat the combined fuel and air mixture prior to the mixture's entry into the combustion chamber.

It is a third object of the invention to provide a method for pulsing an intake valve at specific times within a four-stroke engine cycle and during specific engine operating conditions of the internal combustion engine to operate the engine more efficiently and create lower exhaust emissions.

According to a first aspect of the present invention, a valve timing system is provided for use with an internal combustion engine of the type including at least one cylinder having a piston pivotally coupled to a crankshaft and at least one valve which is operatively disposed within a port containing an amount of fuel. The system includes at least one actuator effective to selectively actuate the at least one valve; a first engine sensor effective to measure a temperature of the engine and to generate a first signal representing the temperature; a second engine sensor effective to monitor the angular position of the crankshaft and to generate a second signal representing the angular position; and a controller communicatively coupled to the at least one actuator and the first and second engine sensors, the controller being effective to receive the first and second signals and to cause the at least one actuator to selectively pulse open the at least one valve based upon the received first and second signals.

According to a second aspect of the present invention, a method is provided for controlling valve actuation within a camless internal combustion engine of the type including at least one cylinder having a piston which is pivotally coupled to a crankshaft, at least one intake valve operatively placed in an intake port containing an amount of fuel, and at least one exhaust valve operatively placed in an exhaust port. The method includes the steps of: monitoring positions of the at least one intake valve and the at least one exhaust valve; monitoring a temperature of the engine; monitoring an angular position of the crankshaft; determining if the engine is above or below a predetermined operating temperature;

and if the engine is determined to be below the predetermined operating temperature, pulsing open the at least one intake valve when the piston is in an exhaust stroke, effective to introduce a small amount of burnt gas into the intake port, thereby heating the intake port and vaporizing the amount of fuel.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
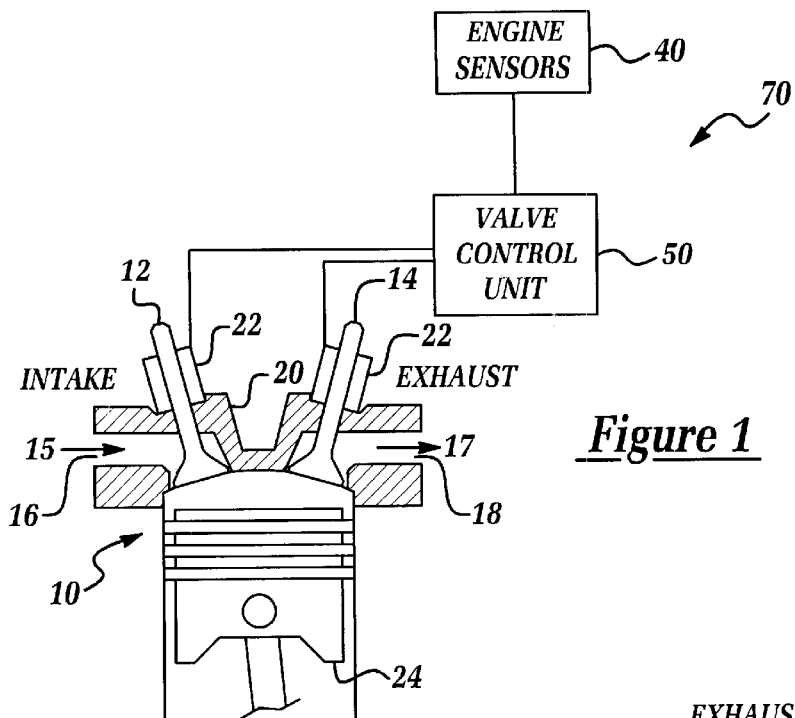
FIG. 1 is a schematic diagram of a system for timing the valve events of an internal combustion engine.

Referring to FIG. 1, there is shown a block diagram of the preferred embodiment of a system 70, which is made in accordance with the teachings of the preferred embodiment of the invention and which is adapted for use in combination with an internal combustion engine of the type having several substantially identical cylinders 10. Each cylinder 10 has a cylinder head 20 which includes an intake valve 12 which selectively delivers an air and fuel mixture 15 to cylinder 10 from an intake port 16, an exhaust valve 14 which selectively discharges exhaust gases 17 from the cylinder 10 through an exhaust port 18. System 70 also includes a conventional piston 24, which is slidably disposed within cylinder 10. While only a single cylinder 10 is shown in FIG. 1 for illustrative purposes, it should be appreciated that in the preferred embodiment, the engine comprises several cylinders 10, which may use a portion of a combined or continuous cylinder head 20.

System 70 includes a control unit or controller 50, a pair of actuators 22 which are each electrically and communicatively coupled to controller 50, and sensors 40 which are communicatively coupled to controller 50. As discussed more fully and completely below, controller 50 receives signals generated by sensors 40, and processes and utilizes the received signals to determine which valves are to be actuated, when the respective valves are to be actuated, and the duration of time for which the respective valves are to be kept open.

In the preferred embodiment, controller 50 is a conventional controller including one or more microprocessors and sub-processors, which cooperatively perform the below-described processes. In one alternate embodiment, controller 50 comprises a portion of a conventional engine control unit ("ECU"). In another alternate embodiment, controller 50 is externally coupled to the engine control unit.

Sensors 40 comprise conventional and commercially available vehicle operating condition sensors, and may include one or more conventional engine temperature sensors, engine speed sensors, crank shaft angular position sensors, and other "fault" detection sensors, which detect faults or abnormalities in the operation of the engine. Sensors 40 are effective to measure engine operating attributes and to respectively generate and communicate signals to controller 50 (and/or to an engine control unit) representing the measured engine operating attribute. For example and without limitation, sensors 40 are effective to sense or detect engine temperature and to communicate a signal to controller 50. Based on the value of this received data, controller 50 determines if the engine has reached operating temperature. Sensors 40 are also effective to sense or detect engine speed and to communicate a signal to controller 50. Based on the value of this received data, controller 50 determines if the engine is at or above its predetermined idle speed. Additionally, sensors 40 are effective to sense or detect the angular position of the crankshaft 26 and to communicate a signal to controller 50 representing the measured or sensed angular position.

Actuators 22 are electromechanical or electrohydraulic devices that are capable receiving signals from controller 50 and to actuate valves 12, 14 in response to the received signals. It should be appreciated that in a multi-cylinder engine, a unique actuator 22 is utilized for each of the valves 12, 14 and each of the actuators 22 is independently coupled to controller 50. In this manner, each of valves 12, 14 may be selectively and independently controlled by controller 50.

Figure 4:
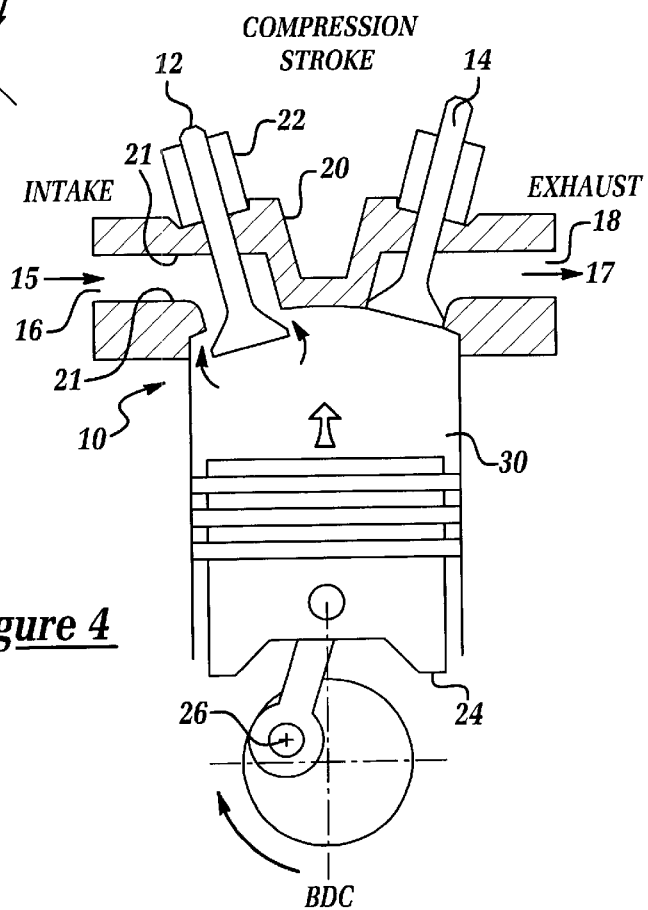
FIG. 4 is a simplified cross-section diagram of a cylinder of an internal combustion engine having electromechanical valve actuators and depicting a pulsed intake valve event during the compression stroke.
Figure 5:
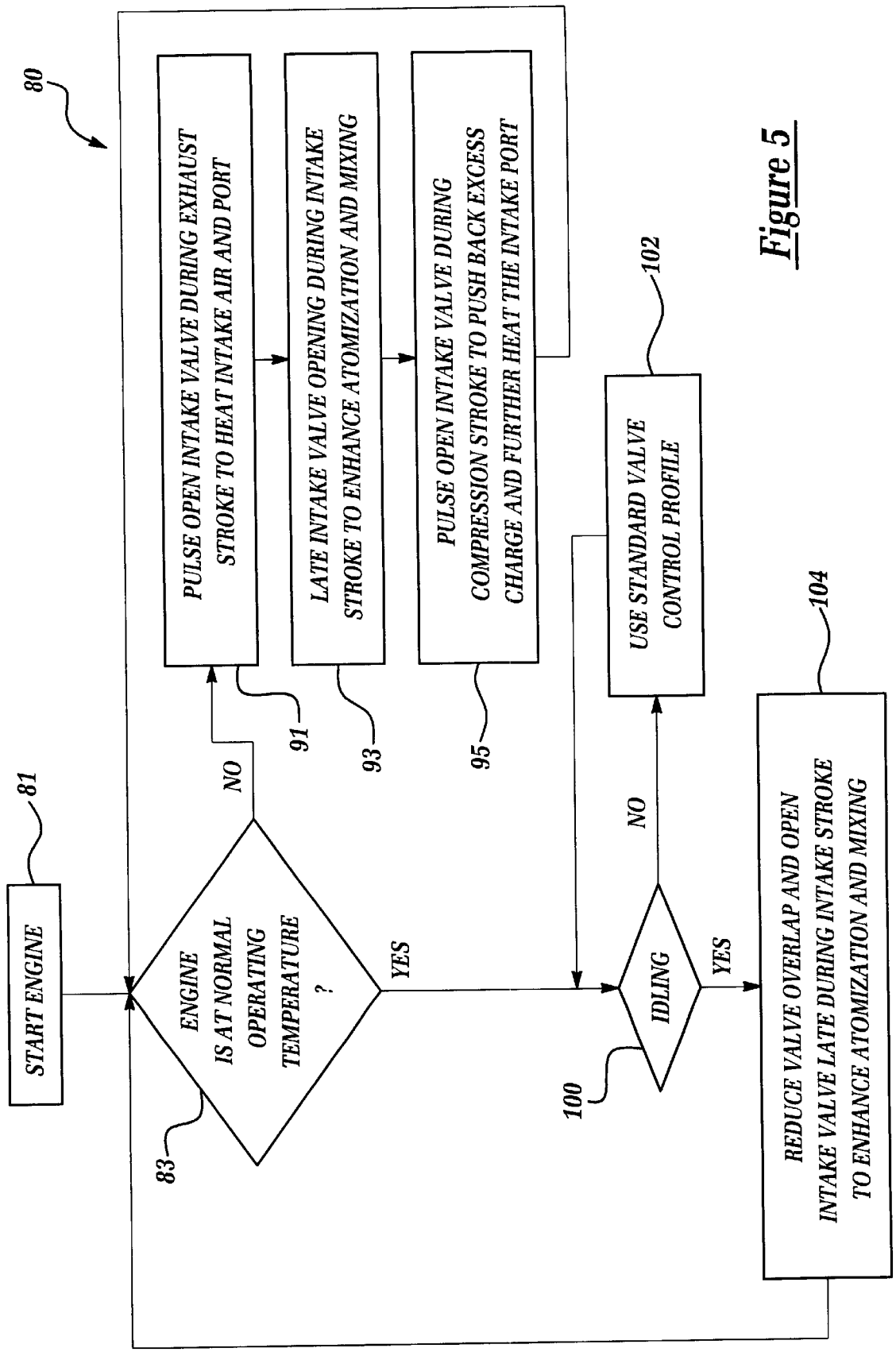
FIG. 5 is a flow chart illustrating the steps of a methodology used in controlling pulsed intake valve events.

In operation, control system 70 applies an internally, preprogrammed control methodology 80, which is depicted in FIG. 5, to effect the incoming fuel and air mixture 15 to preheat and prepare the mixture in the intake port 16 prior to its induction into the combustion chamber. In the preferred embodiment, control methodology 80 is applied through controller 50 to control the various physical steps outlined in FIGS. 2 through 4. The control methodology 80 compensates for cold engine start and engine idling conditions, which are determined or sensed by sensors 40 in a conventional manner. Under these conditions, control system 70 selectively and operatively activates the valves 12, 14 to create a more homogenous fuel/air mix and to enhance the fuel/air burn rate. This eliminates non-vaporized liquid fuel entering the combustion chamber and ensures a more complete combustion process. The result is an improvement in the levels of engine hydrocarbon emission output and lower noise and vibration harshness, "NVH" (i.e., smoother idle performance).

Referring now to step 81 of FIG. 5, the control methodology 80 begins when the engine is started. In step 83, the control unit 50 takes data from the engine sensors 40 to determine if the engine is at its predetermined, normal operating temperature. If it is determined by the engine control unit 50 that the engine is below operating temperature (e.g., a cold start condition), controller 50 proceeds to step 91. As the engine completes its power stroke, the engine control unit 50 opens the exhaust valve 14 by energizing its respective electromechanical actuator 22.

Having completed the power stroke, the piston 24 is at or near bottom-dead-center (BDC) of its travel. The piston 24 continues and travels beyond BDC, on its path back upward toward top-dead-center (TDC), to begin the exhaust stroke.

Figure 2:
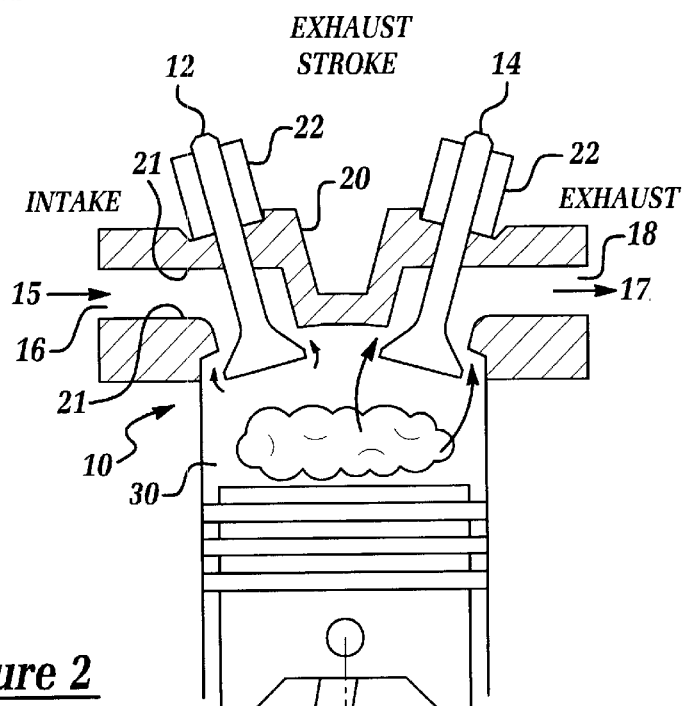
FIG. 2 is a simplified cross-section diagram of a cylinder of an internal combustion engine having electromechanical valve actuators and depicting a pulsed intake valve event during the exhaust stroke.

Referring now to FIG. 2, the piston 24 is pivotally coupled to crankshaft 26 which progresses to an angular rotation of approximately 30 degrees, denoted as θ. At this point, the valve control unit 50 briefly activates or pulses open the intake valve 12 by energizing its respective electromechanical actuator 22, as shown in step 91.

During step 91, and as shown best in FIG. 2, a small portion of hot burnt gases 60 is allowed into the intake port 16 by the pulsed opening of the intake valve 12 at this point in the exhaust stroke. This introduction of hot burnt gases has the effect of curing two distinct cold start problems common within prior systems.

First, due to the relatively cold metal surfaces of the intake port walls 21, the atomized liquid fuel within the air stream will partially condense out and collect as liquid fuel on the cold port walls 21. Second, due to the lower temperature of the incoming air itself, complete atomization mix of the fuel within the air stream is less efficient and less effective. The result is a non-homogenous fuel/air mix with liquid fuel being drawn into the combustion chamber 30.

Thermodynamically, the fuel must be fully mixed and finely atomized within the air stream to achieve an effective burn and to efficiently transfer the fuel's potential chemical energy to kinetic mechanical energy acting on the piston in the form of pressure. Any liquid fuel that enters the combustion chamber and fails to burn at the right instance lowers the efficiency of the combustion process and raises the emissions discharged from the exhaust port 18.

The injection of hot burnt gas into the intake port 16 during step 91 cures these deficiencies by preheating the fuel/air mixture 15 and heating the walls 21 of the intake port 16. The hot burnt gases first serve to heat the existing fuel/air mixture already in the intake port 16, and at the same time, vaporizing any liquid fuel that has condensed out of the fuel/air mixture 15 onto the relatively cold walls 21 of the intake port 16. Further, the small burst of hot burnt gases into the intake port 16, due to the pulsing open of the intake valve 12, serves to heat the relatively cold metal surfaces of the intake port walls 21. This prevents any additional, or continuing condensation of liquid fuel onto the port walls 21 until the engine itself warms to normal operating temperature.

In step 93 of methodology 80, the control unit 50 closes the exhaust valve 14 just before the piston 24 reaches TDC. The piston 24 moves beyond TDC and starts downward toward BDC creating a negative pressure, or vacuum within the combustion chamber 30.

Referring back to FIG. 3, in step 93, the control methodology 80 causes the control unit 50 to "delay" the opening of the intake valve 12. This delayed opening of the intake valve 12 is beyond what would be considered normal timing for the intake valve 12 opening under standard (i.e., fully warmed) engine operating conditions. For instance, normal intake valve opening when the engine is completely warmed would be at, or slightly before TDC.

Figure 3:
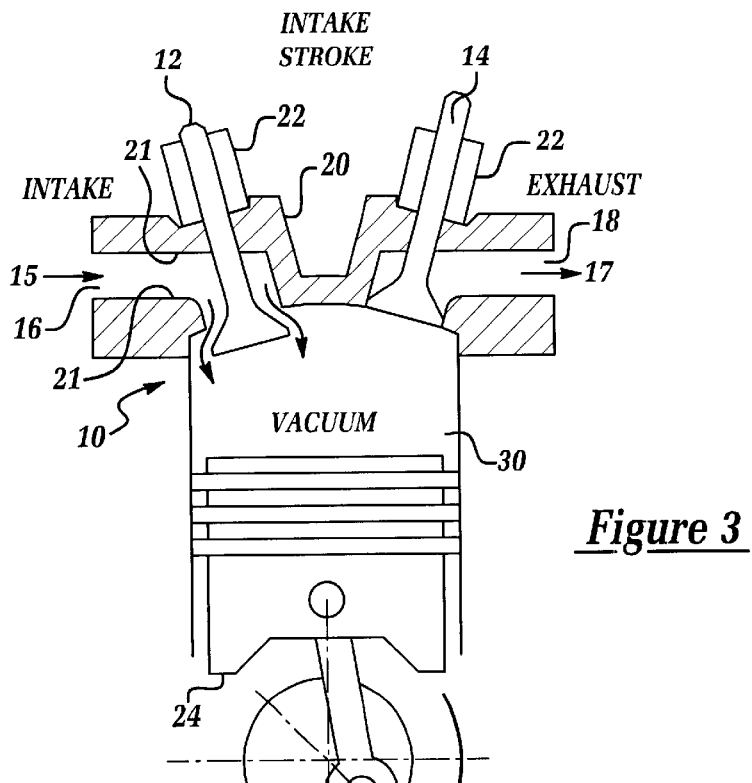
FIG. 3 is a simplified cross-section diagram of a cylinder of an internal combustion engine having electromechanical valve actuators and depicting a delayed intake valve opening.

The delay in opening the intake valve 12 continues until the piston 24 nears BDC, as depicted by the crankshaft's angular measure δ, in FIG. 3. The control unit 50 calculates the timing of the intake valve opening to allow enough angular rotation before BDC to maximize fuel atomization and mixing of a properly calculated amount of fuel/air mixture for the given engine load and conditions. The delay in opening the intake valve 12 creates a greater than normal vacuum within the combustion chamber 30, and hence achieves an enhancement in fuel atomization and mixing. Furthermore, delayed intake valve opening enhances flow motion within the cylinder 10 which improves combustion. The more complete combustion helps overcome the typically low combustion efficiency for an internal combustion engine during cold start and idle.

The engine continues its four-stroke cycle and in step 95 of FIG. 5, as the piston 24 nears BDC, the control unit 50 closes the intake valve 12. The piston 24 then moves beyond BDC and upward toward TDC creating compression. In step 95, control methodology 80 causes the control unit 50 to pulse open the intake valve 12 during the compression stroke, as shown in FIG. 4. This final pulse of the embodied control methodology 80 further heats the intake port walls 21 and the waiting fuel/air mixture 15, as described above. The control methodology 80 then returns to step 83 by causing the control unit 50 to reference the engine sensors 40 to determine if the engine has achieved normal operating temperature.

Once the engine sensors 40 communicate to the control unit 50 that the engine temperature is at the predetermined operating level the control methodology 80 continues in step 100, where the control unit 50 references the engine sensors 40 to determine if the engine is idling. If control unit 50 determines that the engine is not idling (i.e., engine is above idling speeds), controller 50 proceeds to step 102 and applies a standard or conventional valve control profile until such time as the engine returns to idle, and controller 50 proceeds to step 104.

In step 104, the control unit 50 applies an alternate valve opening methodology. More particularly, controller 50 employs the late intake valve opening strategy delineated in step 93 along with the following "valve overlap" reduction strategy. It should be appreciated that there are times during an internal combustion engine's four-stroke cycle when both intake valve and exhaust valve are both at least partially open for a short duration of time. This is commonly referred to as "valve overlap." While valve overlap is employed to reduce NVH, an undesirable feature exists when the engine is at idle speeds. Valve overlap allows exhaust gas to mix with and dilute the already relatively low quantity of air/fuel mix utilized during idle conditions. This dilution reduces the explosive force of the air/fuel mixture, thereby reducing engine efficiency. In step 104 of methodology 80, control unit 50 energizes actuators 22 to operatively reduce the amount or duration of valve overlap when the engine is at idle speeds and therefore causes less air/fuel mixture dilution to occur.

Hence, during "cold" operation conditions (i.e., when the temperature of the engine is relatively cold) controller 50 applies three valve pulsing strategies embodied within steps 91, 93 and 95. When the engine warms to normal operating temperature and runs at idle, controller 50 employs only the late intake valve opening strategy of step 93 along with the foregoing valve overlap reduction strategy. When the engine is warm and above idle, a standard or conventional valve control profile will be applied, as shown in step 102 of FIG. 5. In this manner, the present system 70 provides increased engine operating efficiency and lower exhaust emissions during low speed and cold engine conditions.

It should also be understood that the various embodiments are not limited to the exact construction and method illustrated and described above, but that these previously delineated inventions may be varied without departing from the scope of the inventions as described in the following claims.

What is claimed is:

1. A valve timing system for use with an internal combustion engine of the type including at least one cylinder having a piston pivotally coupled to a crankshaft and at least one valve, said system comprising:

at least one actuator effective to selectively actuate said at least one valve, a first engine sensor effective to measure a temperature of said engine and to generate a first signal representing said temperature;

a second engine sensor effective to monitor an angular position of said crankshaft and to generate a second signal representing said angular position; and a controller communicatively coupled to said at least one actuator and said first and second engine sensors, said controller being effective to receive said first and second signals and to cause said at least one actuator to selectively and briefly pulse open and close said at least one valve during a stroke cycle of said internal combustion engine based upon said received first and second signals.

2. The system of claim 1 wherein said controller is further effective to determine whether said engine is below a predetermined temperature, and based upon said determination to selectively and briefly pulse open and then close said intake valve during an exhaust stroke of said piston, effective to cause exhaust gases to enter said port, thereby heating said port and assisting in vaporizing said amount of fuel.

3. The system of claim 2 wherein said controller is effective to pulse open said intake valve when said angular position of said crankshaft is approximately 30 degrees from bottom dead center.

4. The system of claim 2 wherein said controller is further effective to selectively cause said at least one actuator to open said intake valve late during an intake stroke of said piston, said late opening being effective to create a greater than normal vacuum within said cylinder, thereby enhancing atomization of said amount of fuel within said cylinder.

5. The system of claim 4 wherein said controller is further effective to selectively cause said at least one actuator to briefly pulse open and then close said intake valve during a compression stroke of said piston, effective to further heat said port.

6. The system of claim 5 wherein said cylinder further comprises an exhaust valve, said system further comprising:

at least one second actuator effective to selectively actuate said exhaust valve;

a third engine sensor effective to monitor a speed of said engine and to generate a third signal representing said speed; and wherein said controller is further communicatively coupled to said at least one second actuator and said third engine sensor, said controller being further effective to receive said third signal, to cause said at least one actuator and said at least one second actuator to selectively reduce overlap between said intake valve and said exhaust valve when said engine is at an idle speed.

7. The system of claim 6 wherein said controller is further effective to selectively cause said at least one actuator to open said intake valve late during an intake stroke of said piston when said engine is at an idle speed, said late opening being effective to create a greater than normal vacuum within said cylinder, thereby enhancing atomization of said amount of fuel within said cylinder.

8. A method for controlling valve actuation within a camless internal combustion engine of the type including at least one cylinder having a piston which is pivotally coupled to a crankshaft, at least one intake valve operatively placed in an intake port containing an amount of fuel, and at least one exhaust valve operatively placed in an exhaust port, said method comprising the steps of:

monitoring positions of said at least one intake valve and said at least one exhaust valve;

monitoring a temperature of said engine;

monitoring an angular position of said crankshaft;

determining if said engine is above or below a predetermined operating temperature; and if said engine is determined to be below said predetermined operating temperature, briefly pulsing open and then closing said at least one intake valve when said piston is in an exhaust stroke, effective to introduce a small amount of burnt gas into said intake port, thereby heating said intake port and vaporizing said amount of fuel.

9. The method of claim 8 wherein said at least one intake valve is pulsed open when said angular position of said crankshaft is approximately 30 degrees from bottom dead center.

10. The method of claim 8 further comprising the step of:

if said engine is determined to be below said predetermined operating temperature, delaying actuation of said at least one intake valve when said piston is in an intake stroke, effective to increase vacuum conditions within said cylinder.

11. The method of claim 10 further comprising the step of:

if said engine is determined to be below said predetermined operating temperature, actuating said at least one intake valve when said piston is in a compression stroke, effective to further heat said intake port.

12. The method of claim 11 wherein said at least one intake valve and said at least one exhaust valve are each independently actuated by use of at least one electromechanical actuator.

13. The method of claim 11 wherein said at least one intake valve and said at least one exhaust valve are each independently actuated by use of at least one electrohydraulic actuator.

* * * * *